United States Patent
Prakash

(10) Patent No.: US 8,014,749 B2
(45) Date of Patent: Sep. 6, 2011

(54) METHOD AND APPARATUS OF TRANSMITTING PREFERRED CONTROL CHANNEL CYCLE ATTRIBUTE IN WIRELESS COMMUNICATION SYSTEMS

(75) Inventor: Rajat Prakash, La Jolla, CA (US)

(73) Assignee: Qualcomm, Inc., San Diego, CA (US)

(*) Notice: Subject to any disclaimer, the term of this patent is extended or adjusted under 35 U.S.C. 154(b) by 53 days.

(21) Appl. No.: 12/091,523

(22) PCT Filed: Oct. 27, 2006

(86) PCT No.: PCT/US2006/042011
§ 371 (c)(1),
(2), (4) Date: Oct. 1, 2008

(87) PCT Pub. No.: WO2007/050898
PCT Pub. Date: May 3, 2007

(65) Prior Publication Data
US 2009/0175297 A1 Jul. 9, 2009

Related U.S. Application Data

(60) Provisional application No. 60/731,126, filed on Oct. 27, 2005.

(51) Int. Cl.
*H04M 11/00* (2006.01)
(52) U.S. Cl. .................... 455/403; 370/310
(58) Field of Classification Search .......... None
See application file for complete search history.

(56) References Cited

U.S. PATENT DOCUMENTS

| | | | |
|---|---|---|---|
| 6,571,084 B1* | 5/2003 | Jabbary | 455/69 |
| 2001/0034233 A1* | 10/2001 | Tiedemann et al. | 455/436 |
| 2003/0086385 A1* | 5/2003 | Kwon et al. | 370/320 |
| 2006/0019677 A1* | 1/2006 | Teague et al. | 455/456.3 |

FOREIGN PATENT DOCUMENTS

| | | |
|---|---|---|
| KR | 2003-7481 | 1/2003 |
| WO | 0176110 | 10/2001 |

OTHER PUBLICATIONS

3GPP2: "cdma 2000 High Rate Packet Data Air Interface Specification" 3GPP2 C. S0024, Oct. 27, 2000, pp. 6-29-6-31, XP002423350. http://www.3gpp2.org/public_html/specs/C.S0024_v2.0.pdf. 441 pages.*

(Continued)

*Primary Examiner* — Huy D Vu
*Assistant Examiner* — James P Duffy
(74) *Attorney, Agent, or Firm* — Turocy & Watson, LLP

(57) ABSTRACT

A method and apparatus for transmitting Preferred Control Channel Cycle Attributes in a wireless communication system comprising generating a 8 bit Length field, a 8 bit AttributeID field, a 1 bit PreferredControlChannelCycleEnabled field, a 0 or 15 bits PreferredControlChannelCycle field, a 1 bit PreferredQuickPageEnabled field, a 0 or 15 bits PreferredRQuickPage field, a 1 bit PreferredPagingCarrierEnabled field, a 7 bits PreferredPagingCarrier field and a 0 or 7 bits Reserved field, wherein the Length field indicates the length of the complex attribute in octets and the length of the Reserved field is such that the attribute value is octet aligned; and transmitting the Preferred control channel cycle attribute over an OFDM communication link.

7 Claims, 8 Drawing Sheets

Preferred control channel cycle attribute

| Field | Length (bits) | Default |
|---|---|---|
| Length | 8 | N/A |
| AttributeID | 8 | N/A |
| PreferredControlChannelCycleEnabled | 1 | 0 |
| PreferredControlChannelCycle | 0 or 15 | N/A |
| PreferredQuickPageEnabled | 1 | 0 |
| PreferredRQuickPage | 0 or 15 | N/A |
| PreferredPagingCarrierEnabled | 1 | 0 |
| PreferredPagingCarrier | 7 | N/A |
| Reserved | 7 or 0 | N/A |

OTHER PUBLICATIONS

International Search Report and Written Opinion for PCT Application No. PCT/US 2006/042011, mailed Mar. 19, 2007, 3 pages.

3GPP2: "cdma 2000 High Rate Packet Data Air Interface Specification" 3GPP2 C. S0024, Oct. 27, 2000, pp. 6-29-6-31, XP002423350, retrieved on Mar. 6, 2007. http://www.3gpp2.org/public_html/specs/C.S0024_v2.0.pdf. Last accessed May 23, 2008, 441 pages.

Agilent Technologies: Performing Base Station Over—Air Maintenance with the Agilent E6474A CDMA, Mar. 2002, XP002423351, retrieved from the internet on Mar. 6, 2007, pp. 16-17, 23. http://cp.literature.agilent.com/litweb/pdf/E6474-90042.pdf. Last accessed May 23, 2008, 33 pages.

Liu Dawei, et al. "A New Access Method Used in Beyond 3G Mobile System Using MC-CDMA" in International Conference on Communications, Circuits and Systems and West Sino Expositions, IEEE, 2002. Jun. 29-Jul. 1, 2002, Piscataway, NJ, USA. vol. 1, pp. 170-171, XP010632240, ISBN: 0-7803-7547-5. http://ieeexplore.ieee.org/iel5/8402/26511/01180596.pdf?tp=&arnumber=1180596&isnumber=26511. Last accessed May 23, 2008, 2 pages.

Office Action mailed Feb. 26, 2010 for Korean Patent Application No. 2008-7012461, 3 pages.

3GPP2: "cdma2000 High Rate Packet Data Air Interface Specification", 3GPP2 C. S0024 version 2.0, Oct. 27, 2000.

Office Action mailed Jun. 29, 2010 for Korean Patent Application No. 2008-7012461, 3 pages.

Office Action dated Oct. 9, 2010 for Chinese Patent Application No. 200680049399.6, 11 pages.

Office Action dated Jan. 25, 2011 for European Patent Application No. 06826876.2, 3 pages.

Office Action dated Mar. 1, 2011 for Japanese Patent Application No. 2008-537995, 4 pages.

* cited by examiner

Preferred control channel cycle attribute

| Field | Length (bits) | Default |
|---|---|---|
| Length | 8 | N/A |
| AttributeID | 8 | N/A |
| PreferredControlChannelCycleEnabled | 1 | 0 |
| PreferredControlChannelCycle | 0 or 15 | N/A |
| PreferredQuickPageEnabled | 1 | 0 |
| PreferredRQuickPage | 0 or 15 | N/A |
| PreferredPagingCarrierEnabled | 1 | 0 |
| PreferredPagingCarrier | 7 | N/A |
| Reserved | 7 or 0 | N/A |

Fig 6

METHOD AND APPARATUS OF TRANSMITTING PREFERRED CONTROL CHANNEL CYCLE ATTRIBUTE IN WIRELESS COMMUNICATION SYSTEMS

CLAIM OF PRIORITY UNDER 35 U.S.C. §119

The present Application for Patent claims priority to Provisional Application Ser. No. 60/731,126, entitled "METHODS AND APPARATUS FOR PROVIDING MOBILE BROADBAND WIRELESS LOWER MAC", filed Oct. 27, 2005, assigned to the assignee hereof, and expressly incorporated herein by reference.

BACKGROUND

1. Field

The present disclosure relates generally to wireless communications, and more particularly to methods and apparatus of transmitting preferred control channel cycle attribute.

2. Background

Wireless communication systems have become a prevalent means by which a majority of people worldwide have come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

Wireless communication systems generally utilize different approaches to generate transmission resources in the form of channels. These systems may be code division multiplexing (CDM) systems, frequency division multiplexing (FDM) systems, and time division multiplexing (TDM) systems. One commonly utilized variant of FDM is orthogonal frequency division multiplexing (OFDM) that effectively partitions the overall system bandwidth into multiple orthogonal subcarriers. These subcarriers may also be referred to as tones, bins, and frequency channels. Each subcarrier can be modulated with data. With time division based techniques, a each subcarrier can comprise a portion of sequential time slices or time slots. Each user may be provided with a one or more time slot and subcarrier combinations for transmitting and receiving information in a defined burst period or frame. The hopping schemes may generally be a symbol rate hopping scheme or a block hopping scheme.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and/or code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams transmitted from the base station. Likewise, a mobile terminal can transmit data to the base station or another mobile terminal. In these systems the bandwidth and other system resources are assigned utilizing a scheduler.

The signals, signal formats, signal exchanges, methods, processes, and techniques disclosed herein provide several advantages over known approaches. These include, for example, reduced signaling overhead, improved system throughput, increased signaling flexibility, reduced information processing, reduced transmission bandwidth, reduced bit processing, increased robustness, improved efficiency, and reduced transmission power.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to one embodiment, a method is provided for transmitting a preferred control channel attribute in a wireless communication system comprising a 8 bit Length field, a 8 bit AttributeID field, a 1 bit PreferredControlChannelCycleEnabled field, a 0 or 15 bits PreferredControlChannelCycle field, a 1 bit PreferredQuickPageEnabled field, a 0 or 15 bits PreferredRQuickPage field, a 1 bit PreferredPagingCarrierEnabled field, a 7 bits PreferredPagingCarrier field and a 0 or 7 bits Reserved field, wherein the Length field indicates the length of the complex attribute in octets and the length of the Reserved field is such that the attribute value is octet aligned; and transmitting the Preferred control channel cycle attribute over an OFDM communication link.

According to another an apparatus is provided for transmitting a preferred control channel attribute in a wireless communication system comprising means for generating a 8 bit Length field, a 8 bit AttributeID field, a 1 bit PreferredControlChannelCycleEnabled field, a 0 or 15 bits PreferredControlChannelCycle field, a 1 bit PreferredQuickPageEnabled field, a 0 or 15 bits PreferredRQuickPage field, a 1 bit PreferredPagingCarrierEnabled field, a 7 bits PreferredPagingCarrier field and a 0 or 7 bits Reserved field, wherein the Length field indicates the length of the complex attribute in octets and the length of the Reserved field is such that the attribute value is octet aligned; and transmitting the Preferred control channel cycle attribute over an OFDM communication link.

According to yet another embodiments a computer readable medium for transmitting a preferred control channel attribute in a wireless communication system is provided having a first set of instructions for generating a 8 bit Length field, a 8 bit AttributeID field, a 1 bit PreferredControlChannelCycleEnabled field, a 0 or 15 bits PreferredControlChannelCycle field, a 1 bit PreferredQuickPageEnabled field, a 0 or 15 bits PreferredRQuickPage field, a 1 bit PreferredPagingCarrierEnabled field, a 7 bits PreferredPagingCarrier field and a 0 or 7 bits Reserved field, wherein the Length field indicates the length of the complex attribute in octets and the length of the Reserved field is such that the attribute value is octet aligned and a second set of instructions for transmitting the Preferred control channel cycle attribute over an OFDM communication link.

To the accomplishment of the foregoing and related ends, the one or more embodiments comprise the features hereinafter fully described and particularly pointed out in the claims. The following description and the annexed drawings set forth in detail certain illustrative embodiments of the one or more embodiments. These embodiments are indicative, however, of but a few of the various ways in which the principles of various embodiments may be employed and the described embodiments are intended to include all such embodiments and their equivalents.

BRIEF DESCRIPTION OF THE DRAWINGS

FIG. 6 illustrates a preferred control channel cycle attribute.

DETAILED DESCRIPTION

Figure 1:
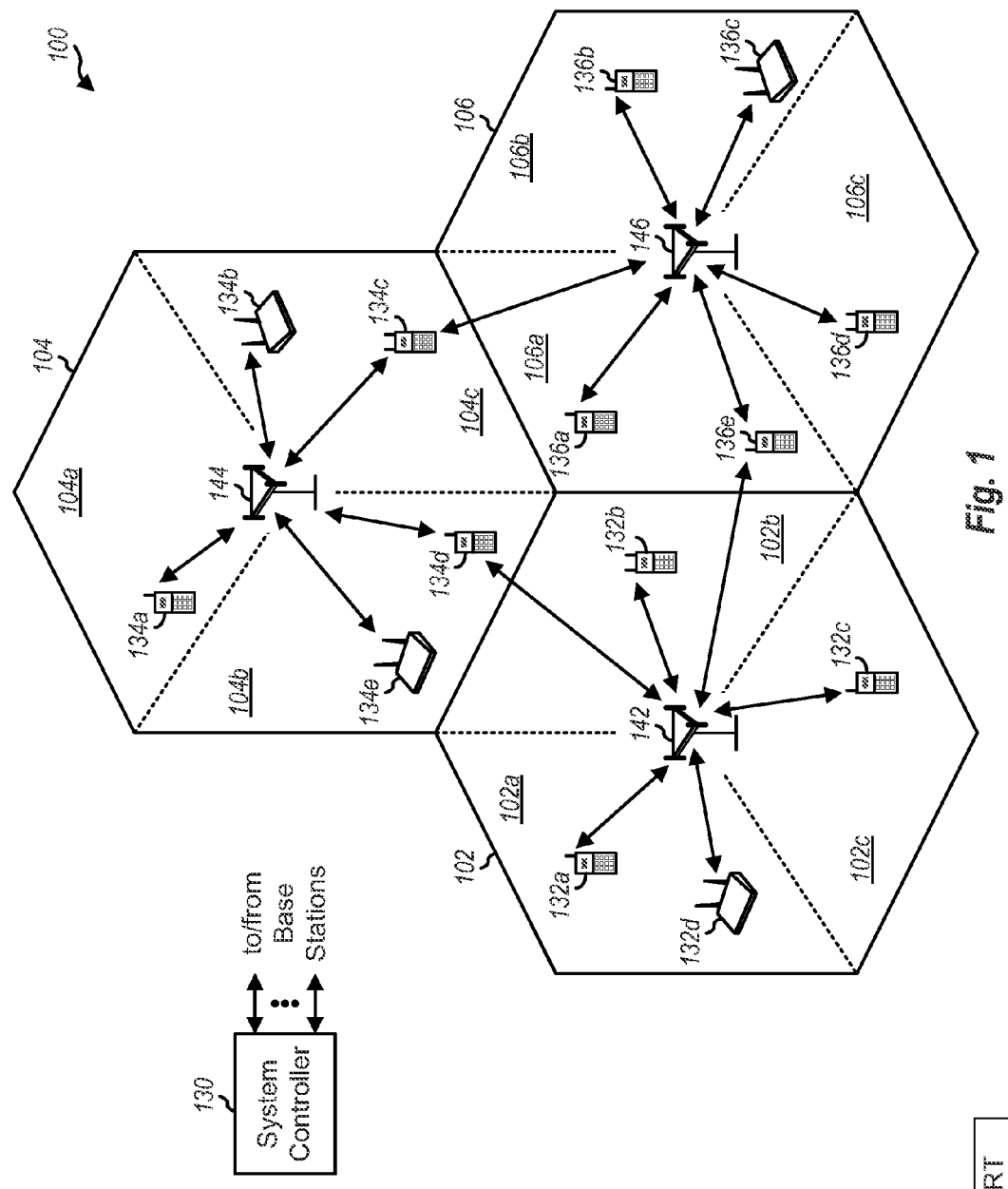
FIG. 1 illustrates embodiments of a multiple access wireless communication system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Referring to FIG. 1, a multiple access wireless communication system according to one aspect is illustrated. A multiple access wireless communication system 100 includes multiple cells, e.g. cells 102, 104, and 106. In the aspect of FIG. 1, each cell 102, 104, and 106 may include an access point 142, 144, and 146 that includes multiple sectors. The multiple sectors are formed by groups of antennas of a base station each responsible for communication with access terminals in a portion of the cell. In cell 102, access point 142 has sectors 102a, 102b, and 102c. In cell 104, access point 144 has sectors 104a, 104b, and 104c. In cell 106, access point 146 has sectors 106a, 106b, and 106c.

Each cell includes several access terminals which are in communication with one or more sectors of each access point. For example, access terminals 132a-132d, 134d, and 136e are in communication with base station 142, access terminals 134a-132e are in communication with access point 144, and access terminals 136a-136e and 134c are in communication with access point 146.

Controller 130 is coupled to each of the cells 102, 104, and 106. Controller 130 may contain one or more connections to multiple networks, e.g. the Internet, other packet based networks, or circuit switched voice networks that provide information to, and from, the access terminals in communication with the cells of the multiple access wireless communication system 100. The controller 130 includes, or is coupled with, a scheduler that schedules transmission from and to access terminals. In other embodiments, the scheduler may reside in each individual cell, each sector of a cell, or a combination thereof.

As used herein, an access point may be a fixed station used for communicating with the terminals and may also be referred to as, and include some or all the functionality of, a base station, a Node B, or some other terminology. An access terminal may also be referred to as, and include some or all the functionality of, a user equipment (UE), a wireless communication device, terminal, a mobile station or some other terminology.

It should be noted that while FIG. 1, depicts physical sectors, i.e. having different antenna groups for different sectors, other approaches may be utilized. For example, utilizing multiple fixed "beams" that each cover different areas of the cell in frequency space may be utilized in lieu of, or in combination with physical sectors. Such an approach is depicted and disclosed in copending U.S. patent application Ser. No. 11/260,895, entitled "Adaptive Sectorization In Cellular System."

Figure 2:
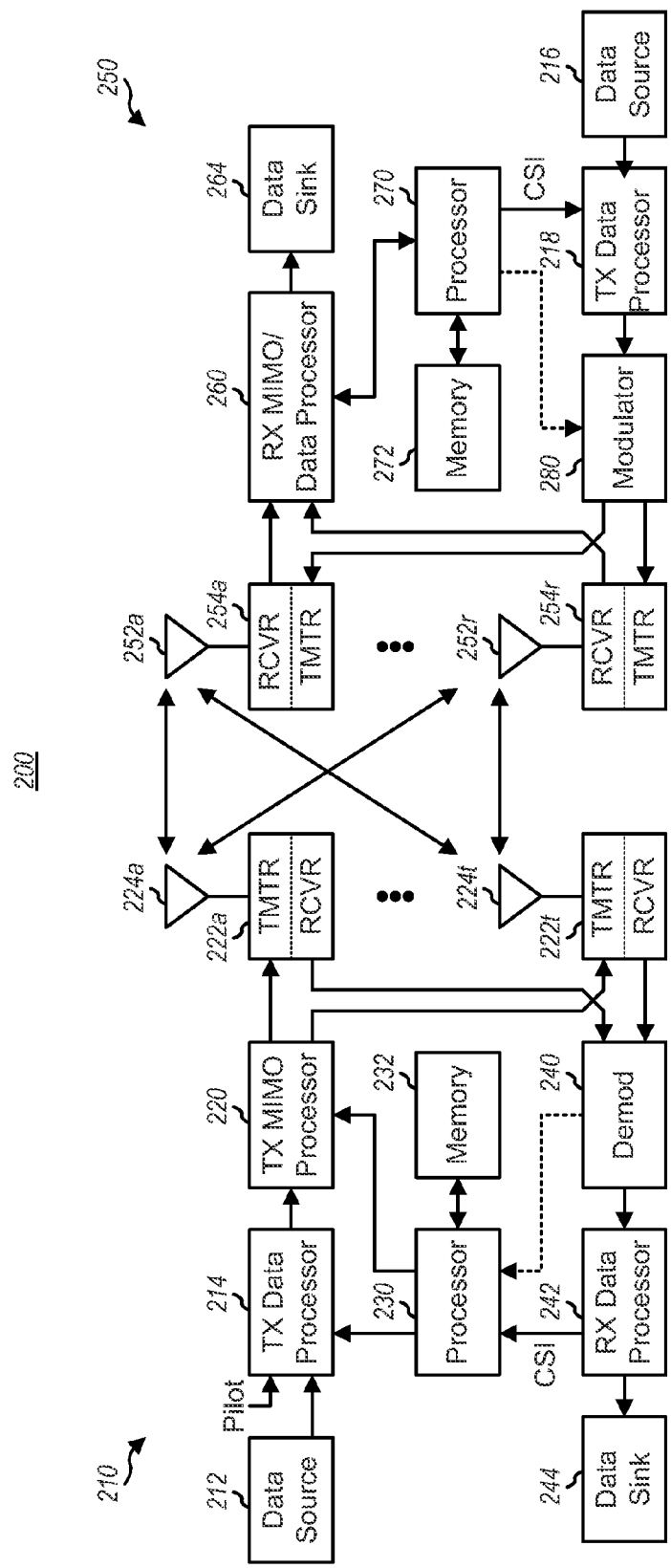
FIG. 2 illustrates embodiments of a transmitter and receiver in a multiple access wireless communication system.

Referring to FIG. 2, a block diagram of an embodiment of a transmitter system 210 and a receiver system 250 in a MIMO system 200 is illustrated. At transmitter system 210, traffic data for a number of data streams is provided from a data source 212 to transmit (TX) data processor 214. In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM, or other orthogonalization or non-orthogonalization techniques. The pilot data is typically a known data pattern that is processed in a known manner and may be used at the receiver system to estimate the channel response. The multiplexed pilot and coded data for each data stream is then modulated (i.e., symbol mapped) based on one or more particular modulation schemes (e.g., BPSK, QSPK, M-PSK, or M-QAM) selected for that data stream to provide modulation symbols. The data rate, coding, and modulation for each data stream may be determined by instructions performed on provided by processor 230.

The modulation symbols for all data streams are then provided to a TX processor 220, which may further process the modulation symbols (e.g., for OFDM). TX processor 220 then provides $N_T$ modulation symbol streams to $N_T$ transmitters (TMTR) 222a through 222t. Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The processing by RX data processor 260 is described in further detail below. Each detected symbol stream includes symbols that are estimates of the modulation symbols transmitted for the corresponding data stream. RX data processor 260 then demodulates, deinterleaves, and decodes each detected symbol stream to recover the traffic data for the data stream. The processing by RX data processor 218 is complementary to that performed by TX processor 220 and TX data processor 214 at transmitter system 210.

RX data processor 260 may be limited in the number of subcarriers that it may simultaneously demodulate, e.g. 512 subcarriers or 5 MHz, and such a receiver should be scheduled on a single carrier. This limitation may be a function of its FFT range, e.g. sample rates at which the processor 260 may operate, the memory available for FFT, or other functions available for demodulation. Further, the greater the number of subcarriers utilized, the greater the expense of the access terminal.

The channel response estimate generated by RX processor 260 may be used to perform space, space/time processing at the receiver, adjust power levels, change modulation rates or schemes, or other actions. RX processor 260 may further estimate the signal-to-noise-and-interference ratios (SNRs) of the detected symbol streams, and possibly other channel characteristics, and provides these quantities to a processor 270. RX data processor 260 or processor 270 may further derive an estimate of the "operating" SNR for the system. Processor 270 then provides channel state information (CSI), which may comprise various types of information regarding the communication link and/or the received data stream. For example, the CSI may comprise only the operating SNR. In other embodiments, the CSI may comprise a channel quality indicator (CQI), which may be a numerical value indicative of one or more channel conditions. The CSI is then processed by a TX data processor 278, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to recover the CSI reported by the receiver system. The reported CSI is then provided to processor 230 and used to (1) determine the data rates and coding and modulation schemes to be used for the data streams and (2) generate various controls for TX data processor 214 and TX processor 220. Alternatively, the CSI may be utilized by processor 270 to determine modulation schemes and/or coding rates for transmission, along with other information. This may then be provided to the transmitter which uses this information, which may be quantized, to provide later transmissions to the receiver.

Processors 230 and 270 direct the operation at the transmitter and receiver systems, respectively. Memories 232 and 272 provide storage for program codes and data used by processors 230 and 270, respectively.

At the receiver, various processing techniques may be used to process the $N_R$ received signals to detect the $N_T$ transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

While FIG. 2 discusses a MIMO system, the same system may be applied to a multi-input single-output system where multiple transmit antennas, e.g. those on a base station, transmit one or more symbol streams to a single antenna device, e.g. a mobile station. Also, a single output to single input antenna system may be utilized in the same manner as described with respect to FIG. 2.

The transmission techniques described herein may be implemented by various means. For example, these techniques may be implemented in hardware, firmware, software, or a combination thereof. For a hardware implementation, the processing units at a transmitter may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units at a receiver may also be implemented within one or more ASICs, DSPs, processors, and so on.

For a software implementation, the transmission techniques may be implemented with modules (e.g., procedures, functions, and so on) that perform the functions described herein. The software codes may be stored in a memory (e.g., memory 230, 272x or 272y in FIG. 2) and executed by a processor (e.g., processor 232, 270x or 270y). The memory may be implemented within the processor or external to the processor.

It should be noted that the concept of channels herein refers to information or transmission types that may be transmitted by the access point or access terminal. It does not require or utilize fixed or predetermined blocks of subcarriers, time periods, or other resources dedicated to such transmissions.

Figure 3A:
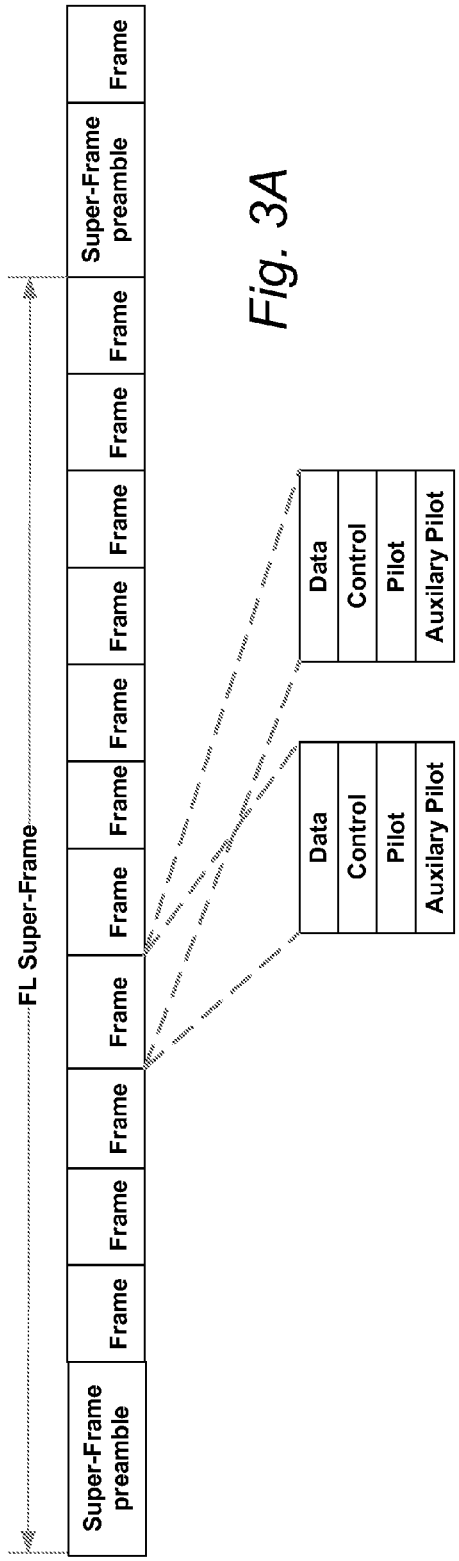
FIGS. 3A and 3B illustrate embodiments of superframe structures for a multiple access wireless communication system.
Figure 3B:
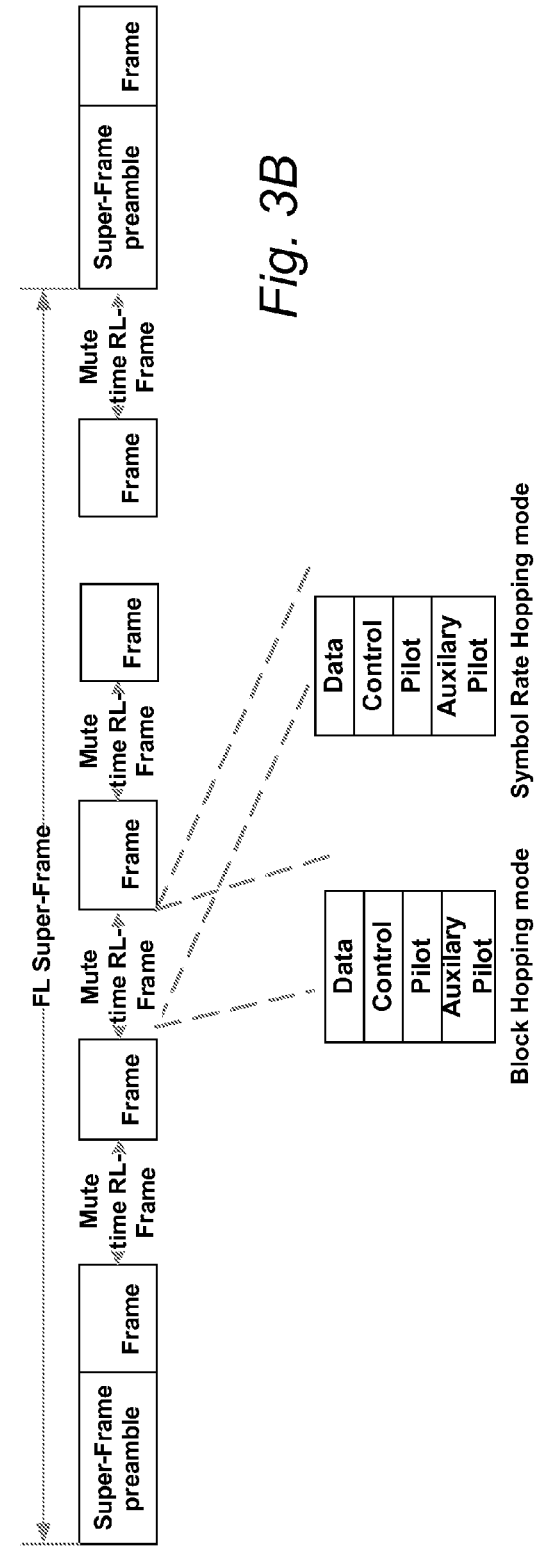

Referring to FIGS. 3A and 3B, embodiments of superframe structures for a multiple access wireless communication system are illustrated. FIG. 3A illustrates embodiments of superframe structures for a frequency division duplexed (FDD) multiple access wireless communication system, while FIG. 3B illustrates embodiments of superframe structures for a time division duplexed (TDD) multiple access wireless communication system. The superframe preamble may be transmitted separately for each carrier or may span all of the carriers of the sector.

In both FIGS. 3A and 3B, the forward link transmission is divided into units of superframes. A superframe may consist of a superframe preamble followed by a series of frames. In an FDD system, the reverse link and the forward link transmission may occupy different frequency bandwidths so that transmissions on the links do not, or for the most part do not, overlap on any frequency subcarriers. In a TDD system, N forward link frames and M reverse link frames define the number of sequential forward link and reverse link frames that may be continuously transmitted prior to allowing transmission of the opposite type of frame. It should be noted that the number of N and M may be vary within a given superframe or between superframes.

In both FDD and TDD systems each superframe may comprise a superframe preamble. In certain embodiments, the superframe preamble includes a pilot channel that includes pilots that may be used for channel estimation by access terminals, a broadcast channel that includes configuration information that the access terminal may utilize to demodulate the information contained in the forward link frame. Further acquisition information such as timing and other information sufficient for an access terminal to communicate on one of the carriers and basic power control or offset information may also be included in the superframe preamble. In other cases, only some of the above and/or other information may be included in this superframe preamble.

As shown in FIGS. 3A and 3B, the superframe preamble is followed by a sequence of frames. Each frame may consist of a same or a different number of OFDM symbols, which may constitute a number of subcarriers that may simultaneously utilized for transmission over some defined period. Further, each frame may operate according to a symbol rate hopping mode, where one or more non-contiguous OFDM symbols are assigned to a user on a forward link or reverse link, or a block hopping mode, where users hop within a block of OFDM symbols. The actual blocks or OFDM symbols may or may not hop between frames.

The configuration attribute Preferred control channel cycle is part of complex attributes and default values are defined for attribute record definition. The access terminal and the access network generally use the Generic Attribute Update Protocol to update configurable attributes belonging to the Default Session Management Protocol. FIG. 8 illustrates the fields of the Preferred control channel cycle attribute along with their lengths and default values. The fields of the Preferred control channel cycle attribute as specified as follows.

The Length field indicates the length of the complex attribute in octets. The sender will set the Length field to the length of the complex attribute excluding the Length field. The AttributeID field will be set to 0x00. The PreferredControlChannelCycleEnabled field will be set to '1' if PreferredControlChannelCycle field is included in the Preferred control channel cycle attribute; otherwise, the sender will set PreferredControlChannelCycleEnabled field to '0'. If PreferredControlChannelCycleEnabled is set to '1', the PreferredControlChannelCycle field will specify the superframe in which the access terminal transitions out of the Sleep State in order to monitor the Control Channel. The PreferredControlChannelCycle field will be omitted from the Preferred control channel cycle attribute if the PreferredControlChannelCycleEnabled field is set to '0'. The PreferredQuickPageEnabled field will be set to '1' if the PreferredRQuickPage field is included in the Preferred control channel cycle attribute; otherwise, the PreferredQuickPageEnabled field will be set field to '0'. If the PreferredQuickPageEnabled is set to '1', the PreferredRQuickPage field will be set to specify the response of the access terminal to a QuickPage packet. The PreferredRQuickPage field will be omitted from the Preferred control channel cycle attribute if PreferredQuickPageEnabled is set to '0'. The PreferredPagingCarrierEnabled field will be set to '1' if the PreferredPagingCarrier field specifies a preferred paging operating carrier; otherwise, the PreferredPagingCarrierEnabled field will be set to '0'. If the PreferredPagingCarrierEnabled is set to '1', the PreferredPagingCarrier field will specify the preferred paging operating carrier. The Reserved field has a length such that the Preferred control channel cycle attribute value is octet aligned. The value of the Reserved field will be set to zero.

In one embodiment both access terminal and access point transmit preferred control channel cycle attribute over a communication link. Using communication link and based upon predetermined timing, system conditions or other decision criteria, the access point or the access terminal will transmit Preferred control channel cycle attribute. The communication link may be implemented using communication protocols/standards such as World Interoperability for Microwave Access (WiMAX), infrared protocols such as Infrared Data Association (IrDA), short-range wireless protocols/technologies, Bluetooth® technology, ZigBee® protocol, ultra wide band (UWB) protocol, home radio frequency (HomeRF), shared wireless access protocol (SWAP), wideband technology such as a wireless Ethernet compatibility alliance (WECA), wireless fidelity alliance (Wi-Fi Alliance), 802.11 network technology, public switched telephone network technology, public heterogeneous communications network technology such as the Internet, private wireless communications network, land mobile radio network, code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple (OFDM), orthogonal frequency division multiple access (OFDMA), orthogonal frequency division multiple FLASH (OFDM-FLASH), global system for mobile communications (GSM), single carrier (1×) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

The access terminal is configured to receive and transmit the preferred control channel cycle attribute and similarly the access point is configured to transmit and receive the preferred control channel cycle attribute using the communication link 406. The Preferred control channel cycle attribute comprises a 8 bit Length field, a 8 bit Attribute ID field, a 1 bit PreferredControlChannelCycleEnabled field, a 0 or 15 bit PreferredControlChannelCycle field, a 1 bit Preferred QuickPageEnabled field, a 0 or 15 bit PreferredRQuickPage field, a 1 bit PreferredPagingCarrierEnabled field, a 7 bit PreferredPagingCarrier field and 7 or 0 bit Reserved field. Generally, a message data structure is used to store the Preferred control channel cycle attribute in memory, wherein the data structure is limited to use 8 bits to store Length field, 8 bits to store Attribute ID field, 1 bit to store PreferredControlChannelCycleEnabled field, 0 or 15 bits to store PreferredControlChannelCycle field, 1 bit to store Preferred QuickPageEnabled field, 0 or 15 bit to store PreferredRQuickPage field, 1 bit to store PreferredPagingCarrierEnabled Filed, 7 bit to store PreferredPagingCarrier field and 7 or 0 bit to store Reserved fields.

The access point or access terminal generates the PreferredPaging Attribute by setting the values for Length field, Attribute ID field, PreferredControlChannelCycleEnabled field, PreferredControlChannelCycle field, Preferred QuickPageEnabled field, PreferredRQuickPage field, PreferredPagingCarrierEnabled field, PreferredPagingCarrier Filed and Reserved fields. The Length field defines the length of the complex attribute in octets. The sender will set this field to the length of the complex attribute excluding the Length field. The AttributeID will be set to 0x00. The PreferredControlChannelCycleEnabled field will be set to '1' if PreferredControlChannelCycle field is included in this attribute; otherwise the sender will set this field to '0'. If PreferredControlChannelCycleEnabled is set to '1', this field will specify the superframe in which the access terminal transitions out of the Sleep State in order to monitor the Control Channel. This filed will be omitted if PreferredControlChannelCycleEnabled is set to '0'. PreferredQuickPageEnabled field will be set to '1' if the PreferredRQuickPage field is included in this attribute; otherwise, this filed will be set to '0'. If the PreferredQuickPageEnabled is set to '1', PreferredRQuickPage field will be set to specify the response of the access terminal to a QuickPage packet. This filed will be omitted if PreferredQuickPageEnabled is set to '0'. The length of Reserved field will be such that the attribute value is octet aligned. This filed will be set to zero.

Figure 4A:
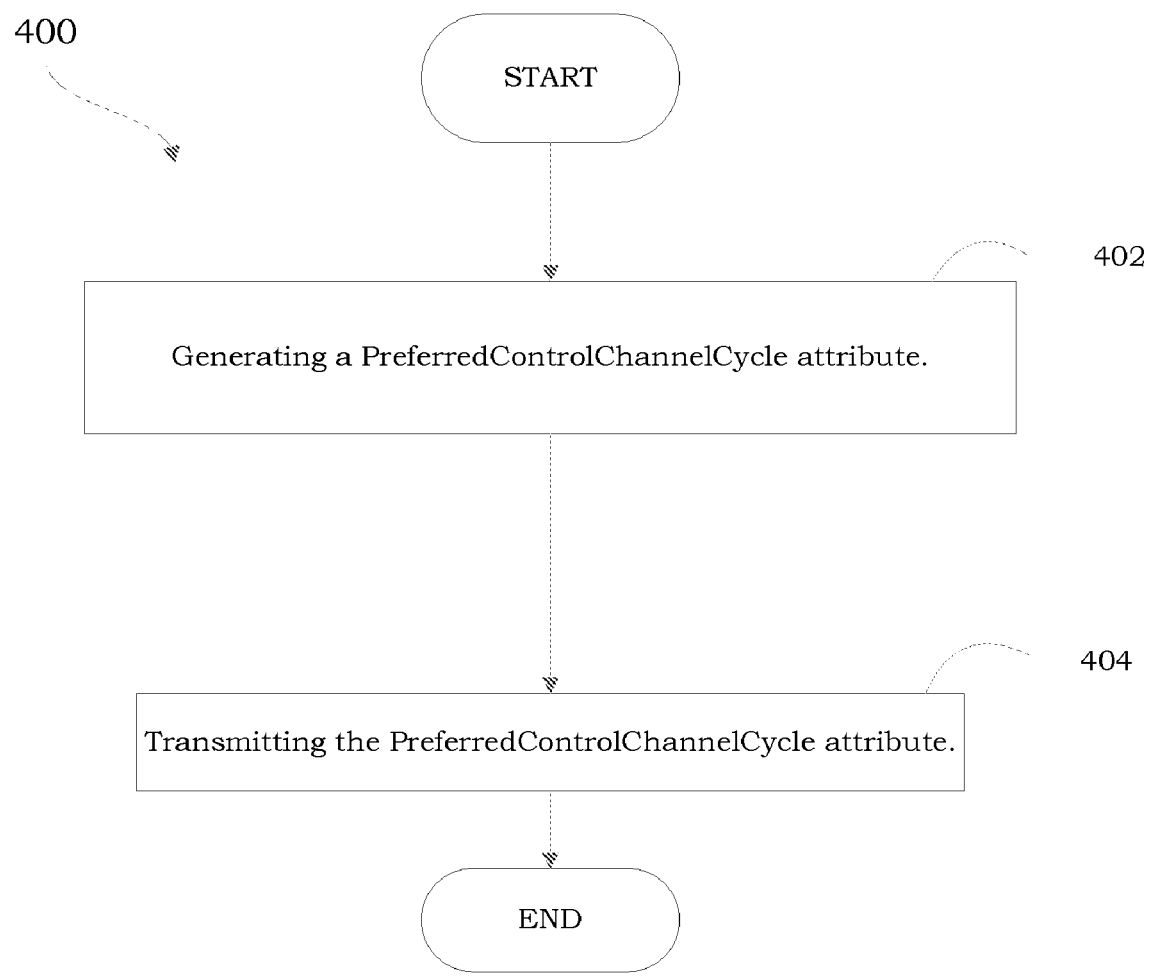
FIG. 4A illustrates a flow diagram of a process of transmitting preferred control channel cycle attributes in wireless communication system.

FIG. 4A illustrates a flow diagram of the process 400 for transmitting Preferred control channel cycle attributes, according to an embodiment. At 402, the sender which can be an access point or an access terminal generates a 8 bit Length field, an 8 bit Attribute ID field, a 1 bit PreferredControlChannelCycleEnabled field, a 0 or 15 bit PreferredControlChannelCycle field, a 1 bit Preferred QuickPageEnabled field, a 0 or 15 bit PreferredRQuickPage field, a 1 bit PreferredPagingCarrierEnabled field, a 7 bit PreferredPagingCarrier field and 7 or 0 bit Reserved field. At 404, the sender transmits the generated signal comprising a 8 bit Length field, an 8 bit Attribute ID field, a 1 bit PreferredControlChannelCycleEnabled field, a 0 or 15 bit PreferredControlChannelCycle field, a 1 bit Preferred QuickPageEnabled field, a 0 or 15 bit PreferredRQuickPage field, a 1 bit PreferredPagingCarrierEnabled field, a 7 bit PreferredPagingCarrier field and 7 or 0 bit Reserved field over an OFDM communication link.

Figure 4B:
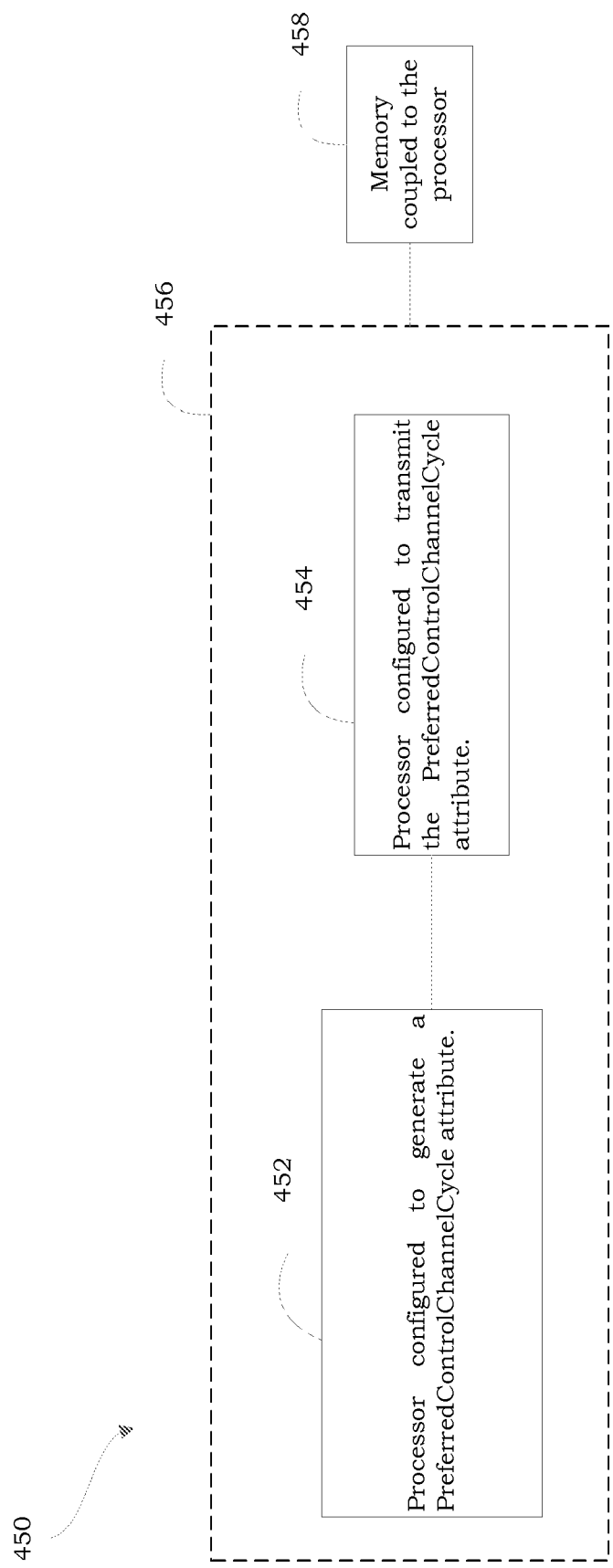
FIG. 4B illustrates a module for transmitting preferred control channel cycle attributes in a wireless communication system.

FIG. 4B illustrates a processor 450 of the process of transmitting preferred control channel cycle attribute in a wireless network. The processor referred to may be electronic devices and may comprise one or more processors configured to receive the block. A processor 452 is configured to generate a 8 bit Length field, a 8 bit Attribute ID field, a 1 bit PreferredControlChannelCycleEnabled field, a 0 or 15 bit PreferredControlChannelCycle field, a 1 bit Preferred QuickPageEnabled field, a 0 or 15 bit PreferredRQuickPage field, a 1 bit PreferredPagingCarrierEnabled field, a 7 bit PreferredPagingCarrier field and 7 or 0 bit Reserved field. A processor 454 is configured to transmit the generated signal comprising a 8 bit Length field, an 8 bit Attribute ID field, a 1 bit PreferredControlChannelCycleEnabled field, a 0 or 15 bit PreferredControlChannelCycle field, a 1 bit Preferred QuickPageEnabled field, a 0 or 15 bit PreferredRQuickPage field, a 1 bit PreferredPagingCarrierEnabled field, a 7 bit PreferredPagingCarrier field and 7 or 0 bit Reserved field over an OFDM communication link. The functionality of the discrete processors 452 to 454 depicted in the figure may be combined into a single processor 456. A memory 458 is also coupled to the processor 456.

In an embodiment, an apparatus comprises means for generating a 8 bit Length field, a 8 bit Attribute ID field, a 1 bit PreferredControlChannelCycleEnabled field, a 0 or 15 bit PreferredControlChannelCycle field, a 1 bit Preferred QuickPageEnabled field, a 0 or 15 bit PreferredRQuickPage field, a 1 bit PreferredPagingCarrierEnabled field, a 7 bit PreferredPagingCarrier field and 7 or 0 bit Reserved field at 552. The apparatus further comprises means for transmitting the generated signal comprising a 8 bit Length field, a 8 bit Attribute ID field, a 1 bit PreferredControlChannelCycleEnabled field, a 0 or 15 bit PreferredControlChannelCycle field, a 1 bit Preferred QuickPageEnabled field, a 0 or 15 bit PreferredRQuickPage field, a 1 bit PreferredPagingCarrierEnabled field, a 7 bit PreferredPagingCarrier field and 7 or 0 bit Reserved field over an OFDM communication link. The means described herein may comprise one or more processors.

Figure 5A:
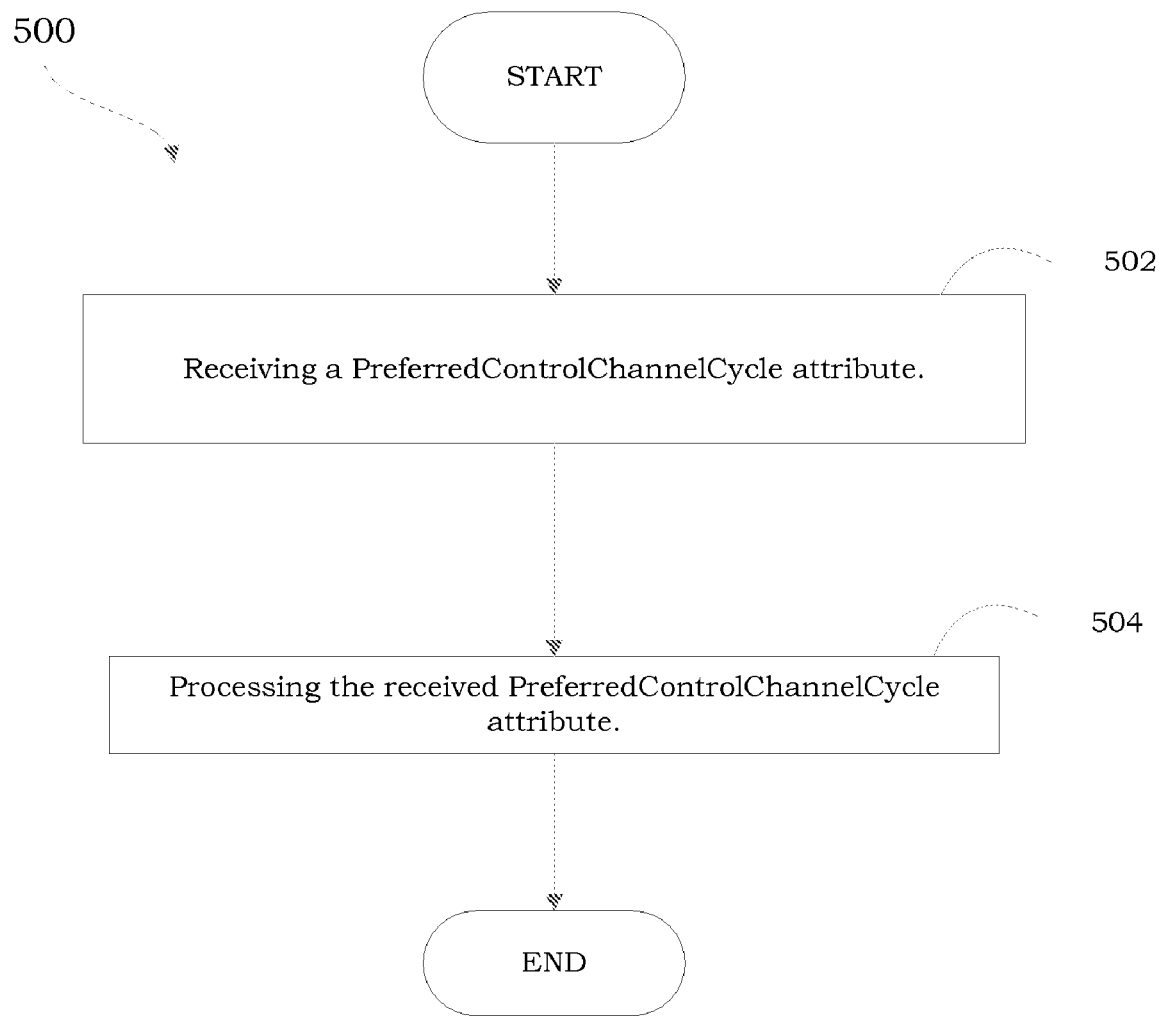
FIG. 5A illustrates a flow diagram of a process for receiving preferred control channel cycle attributes in a wireless communication system.

FIG. 5A illustrates a flow diagram of the process 500 for receiving preferred control channel cycle attributes, according to an embodiment. At 502, the receiver which can be an access point or an access terminal receives a 8 bit Length field, an 8 bit Attribute ID field, a 1 bit PreferredControlChannelCycleEnabled field, a 0 or 15 bit PreferredControlChannelCycle field, a 1 bit Preferred QuickPageEnabled field, a 0 or 15 bit PreferredRQuickPage field, a 1 bit PreferredPagingCarrierEnabled field, a 7 bit PreferredPagingCarrier field and 7 or 0 bit Reserved field. At 504, the receiver processes the received signal comprising a 8 bit Length field, an 8 bit Attribute ID field, a 1 bit PreferredControlChannelCycleEnabled field, a 0 or 15 bit PreferredControlChannelCycle field, a 1 bit Preferred QuickPageEnabled field, a 0 or 15 bit PreferredRQuickPage field, a 1 bit PreferredPagingCarrierEnabled field, a 7 bit PreferredPagingCarrier field and 7 or 0 bit Reserved field over an OFDM communication link.

Figure 5B:
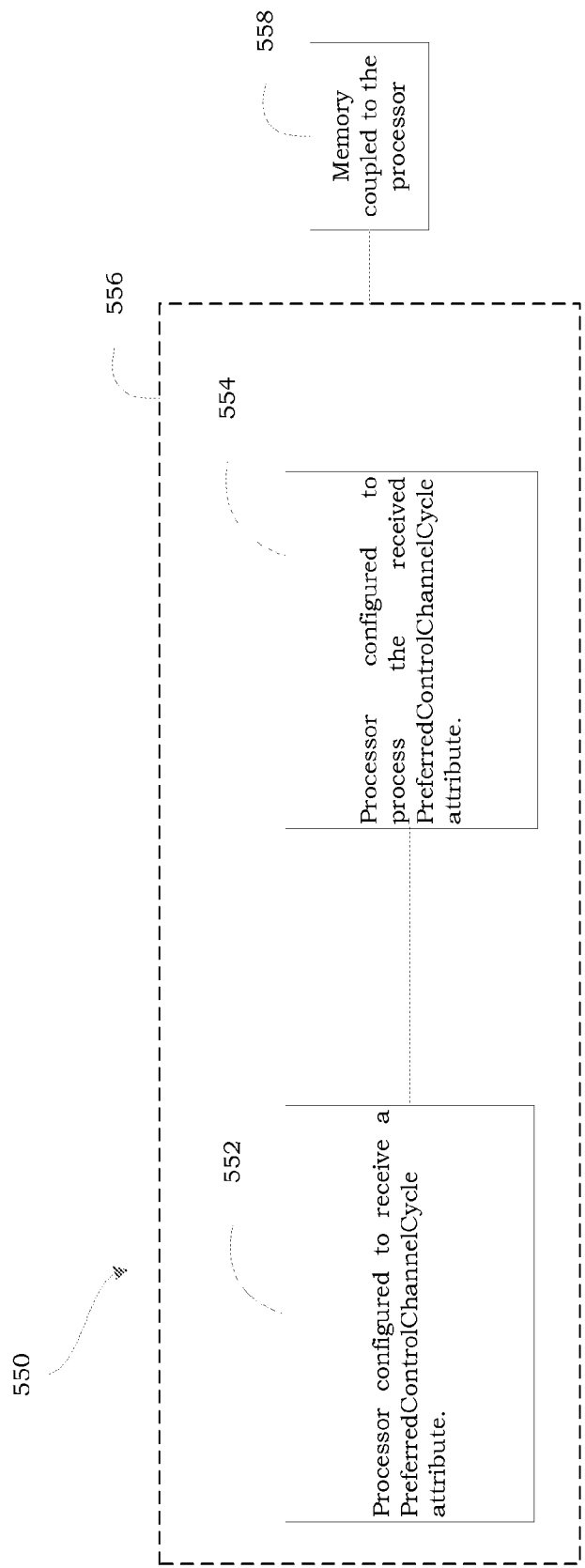
FIG. 5B illustrates a module for receiving preferred control channel cycle attributes in a wireless communication system.

FIG. 5B illustrates a processor 550 of the process of transmitting preferred control channel cycle attribute in a wireless network. The processor referred to may be electronic devices and may comprise one or more processors configured to receive the block. A processor 552 is configured to receive a 8 bit Length field, a 8 bit Attribute ID field, a 1 bit PreferredControlChannelCycleEnabled field, a 0 or 15 bit PreferredControlChannelCycle field, a 1 bit Preferred QuickPageEnabled field, a 0 or 15 bit PreferredRQuickPage field, a 1 bit PreferredPagingCarrierEnabled field, a 7 bit PreferredPagingCarrier field and 7 or 0 bit Reserved field. A processor 554 is configured to process the received signal comprising a 8 bit Length field, an 8 bit Attribute ID field, a 1 bit PreferredControlChannelCycleEnabled field, a 0 or 15 bit PreferredControlChannelCycle field, a 1 bit Preferred QuickPageEnabled field, a 0 or 15 bit PreferredRQuickPage field, a 1 bit PreferredPagingCarrierEnabled field, a 7 bit PreferredPagingCarrier field and 7 or 0 bit Reserved field over an OFDM communication link. The functionality of the discrete processors 552 to 554 depicted in the figure may be combined into a single processor 556. A memory 558 is also coupled to the processor 556.

In an embodiment, an apparatus comprises means for receiving a 8 bit Length field, a 8 bit Attribute ID field, a 1 bit PreferredControlChannelCycleEnabled field, a 0 or 15 bit PreferredControlChannelCycle field, a 1 bit Preferred QuickPageEnabled field, a 0 or 15 bit PreferredRQuickPage field, a 1 bit PreferredPagingCarrierEnabled field, a 7 bit PreferredPagingCarrier field and 7 or 0 bit Reserved field. The apparatus further comprises means for processing the received signal comprising a 8 bit Length field, a 8 bit Attribute ID field, a 1 bit PreferredControlChannelCycleEnabled field, a 0 or 15 bit PreferredControlChannelCycle field, a 1 bit Preferred QuickPageEnabled field, a 0 or 15 bit PreferredRQuickPage field, a 1 bit PreferredPagingCarrierEnabled field, a 7 bit PreferredPagingCarrier field and 7 or 0 bit Reserved field over an OFDM communication link. The means described herein may comprise one or more processors.

Furthermore, embodiments may be implemented by hardware, software, firmware, middleware, microcode, or any combination thereof. When implemented in software, firmware, middleware or microcode, the program code or code segments to perform the necessary tasks may be stored in a machine readable medium such as a separate storage(s) not shown. A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Various modifications to these embodiments will be readily apparent to those skilled in the art, and the generic principles defined herein may be applied to other embodiments. Thus, the description is not intended to be limited to the embodiments shown herein but is to be accorded the widest scope consistent with the principles and novel features disclosed herein.

I claim:

1. A method for transmitting a preferred control channel cycle attribute in a wireless communication system characterized in that:
   generating the preferred control channel cycle attribute that includes an 8 bit Length field, an 8 bit AttributeID field, a 1 bit PreferredControlChannelCycleEnabled field, a 0 or 15 bits PreferredControlChannelCycle field, a 1 bit PreferredQuickPageEnabled field, a 0 or 15 bits PreferredRQuickPage field, a 1 bit PreferredPagingCarrierEnabled field, a 7 bits PreferredPagingCarrier field and a 0 or 7 bits Reserved field, wherein the Length field indicates a length of the preferred control channel cycle attribute in octets and the length of the Reserved field is such that a value of the preferred control channel cycle attribute is octet aligned; and
   transmitting the preferred control channel cycle attribute over an OFDM communication link to at least one of an access terminal or an access point.

2. The method as claimed in claim 1, characterized in that setting PreferredControlChannelCycleEnabled field to '1' if PreferredControlChannelCycle field is included in the attribute, otherwise, setting this field to '0'.

3. The method as claimed in claim 1, characterized in that, setting PreferredQuickPageEnabled field to '1' if the PreferredRQuickPage P field is included in the attribute; otherwise, setting this field to '0'.

4. A non-transitory computer-readable medium including instructions stored thereon, characterized in that:
   a set of instructions for generating a preferred control channel cycle attribute that includes an 8 bit Length field, an 8 bit AttributeID field, a 1 bit PreferredControlChannelCycleEnabled field, a 0 or 15 bits PreferredControlChannelCycle field, a 1 bit PreferredQuickPageEnabled field, a 0 or 15 bits PreferredRQuickPage field, a 1 bit PreferredPagingCarrierEnabled field, a 7 bits PreferredPagingCarrier field and a 0 or 7 bits Reserved field, wherein the Length field indicates a length of the preferred control channel cycle attribute in octets and a length of the Reserved field is such that a value of the preferred control channel cycle attribute is octet aligned; and
   a set of instructions for transmitting the preferred control channel cycle attribute over an OFDM communication link to at least one of an access terminal or an access point.

5. An apparatus operable in a wireless communication system, the apparatus characterized in that:
   means for generating a preferred control channel cycle attribute that includes an 8 bit Length field, an 8 bit AttributeID field, a 1 bit PreferredControlChannelCycleEnabled field, a 0 or 15 bits PreferredControlChannelCycle field, a 1 bit PreferredQuickPageEnabled field, a 0 or 15 bits PreferredRQuickPage field, a 1 bit PreferredPagingCarrierEnabled field, a 7 bits PreferredPagingCarrier field and a 0 or 7 bits Reserved field, wherein the Length field indicates a length of the preferred control channel cycle attribute in octets and the length of the Reserved field is such that a value of the preferred control channel cycle attribute is octet aligned; and
   means for transmitting the preferred control channel cycle attribute over an OFDM communication link to at least one of an access terminal or an access point.

6. The apparatus as claimed in claim 5, characterized in that means for setting PreferredControlChannelCycleEnabled field to '1' if PreferredControlChannelCycle field is included in the attribute, otherwise, setting this field to '0'.

7. The apparatus as claimed in claim 5, characterized in that means for setting PreferredQuickPageEnabled field to '1' if the PreferredRQuickPage P field is included in the attribute, otherwise, setting this field to '0'.

* * * * *